(12) United States Patent
Lung et al.

(10) Patent No.: US 8,941,983 B2
(45) Date of Patent: Jan. 27, 2015

(54) DEVICE INSTALLATION SYSTEMS AND METHODS

(75) Inventors: Chen Yun Lung, Taipei (TW); Da Long Sun, Guangdong (CN); Zhi Qiang Li, Guangdong (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1141 days.

(21) Appl. No.: 12/541,534

(22) Filed: Aug. 14, 2009

(65) Prior Publication Data

US 2011/0037358 A1 Feb. 17, 2011

(51) Int. Cl.
  *G06F 1/16* (2006.01)
  *G06F 1/18* (2006.01)

(52) U.S. Cl.
  CPC ........................... *G06F 1/187* (2013.01)
  USPC ...................................... 361/679.39

(58) Field of Classification Search
  USPC .............. 361/679.01, 679.02, 679.33–679.45
  See application file for complete search history.

(56) References Cited

U.S. PATENT DOCUMENTS

| | | | |
|---|---|---|---|
| 4,633,350 A | 12/1986 | Hanson | |
| 5,319,519 A | 6/1994 | Sheppard | |
| 5,481,431 A | 1/1996 | Siahpolo | |
| 5,587,889 A | 12/1996 | Sacherman | |
| 5,595,501 A | 1/1997 | Ho | |
| 5,599,080 A | 2/1997 | Ho | |
| 5,612,927 A | 3/1997 | Morrison | |
| 5,680,293 A | 10/1997 | McAnally | |
| 5,682,291 A * | 10/1997 | Jeffries et al. | 361/679.58 |
| 5,828,547 A * | 10/1998 | Francovich et al. | 361/679.39 |
| 6,040,980 A | 3/2000 | Johnson | |
| 6,069,789 A | 5/2000 | Jung | |
| 6,094,342 A | 7/2000 | Dague | |
| 6,262,883 B1 | 7/2001 | Kim | |
| 6,404,641 B1 * | 6/2002 | Fisk et al. | 361/727 |
| 6,418,011 B2 * | 7/2002 | Omori | 361/679.33 |
| 6,616,106 B1 * | 9/2003 | Dean et al. | 248/27.1 |
| 6,666,414 B2 * | 12/2003 | Dean et al. | 248/27.3 |
| 7,036,783 B2 * | 5/2006 | Chen et al. | 248/298.1 |
| 7,068,502 B2 * | 6/2006 | Chen et al. | 361/679.39 |
| 7,102,885 B2 * | 9/2006 | Chen et al. | 361/679.31 |
| 7,212,411 B2 | 5/2007 | Williams | |
| 7,259,960 B2 | 8/2007 | Hua | |
| 7,360,295 B2 * | 4/2008 | Reilley | 29/603.03 |
| 2004/0179333 A1 * | 9/2004 | Xu | 361/685 |
| 2005/0040306 A1 * | 2/2005 | Chen et al. | 248/298.1 |
| 2005/0094369 A1 * | 5/2005 | Chen et al. | 361/685 |
| 2006/0187631 A1 * | 8/2006 | Muenzer et al. | 361/685 |
| 2006/0187632 A1 * | 8/2006 | Chen et al. | 361/685 |
| 2006/0227502 A1 * | 10/2006 | Cheng | 361/685 |
| 2007/0127204 A1 * | 6/2007 | Muenzer et al. | 361/685 |
| 2007/0139869 A1 * | 6/2007 | Chen et al. | 361/679 |
| 2008/0080129 A1 * | 4/2008 | Morris | 361/685 |
| 2008/0094794 A1 | 4/2008 | Hass | |

\* cited by examiner

*Primary Examiner* — Adrian S Wilson
(74) *Attorney, Agent, or Firm* — Hewlett-Packard Patent Department

(57) ABSTRACT

A device mounting system is provided. The system includes a housing having a first surface having a first member disposed thereupon. The system also includes a mounting bracket adapted to receive the housing; the mounting bracket including a first rigid surface having a first feature adapted to engage the first member. A latch can be disposed at least partially within the first feature. The latch can be adapted to permit the insertion and attachment of the first member to the first feature when disposed in a first position and to permit the detachment and removal of the first member from the first feature when disposed in a second position.

20 Claims, 6 Drawing Sheets

DEVICE INSTALLATION SYSTEMS AND METHODS

BACKGROUND OF THE INVENTION

Description of the Related Art

This section is intended to introduce the reader to various aspects of art which may be related to one or more embodiments discussed herein. This discussion is believed helpful in providing the reader with a general background in the art, and accordingly understood that the provided information should be read in this light and not as an admission of any prior art.

Many desktop and workstation computing devices are equipped with an internal rack system designed to mount a wide variety of components. Typical components mounted in such racks include power supplies, data storage devices, data read/write devices, and optical disk drives. Since the components mounted within the rack are electrically connected to disparate portions of the computing device, it is preferred to maintain the position, orientation and configuration of all installed components regardless of the physical orientation of the computing device in which they are housed. Traditionally a plurality of fasteners, most typically four threaded studs, has been used to attach the component to the rack. These fasteners must be removed, the component positioned in the rack, and the fasteners reinstalled, to securely mount the component within the rack.

SUMMARY OF THE INVENTION

A device mounting system is provided. The system includes a housing having a first surface having a first member disposed thereupon. The system also includes a mounting bracket adapted to receive the housing; the mounting bracket including a first rigid surface having a first feature adapted to engage the first member. A latch can be disposed at least partially within the first feature. The latch can be adapted to permit the insertion and attachment of the first member to the first feature when disposed in a first position and to permit the detachment and removal of the first member from the first feature when disposed in a second position.

A method of mounting a device is also provided. A first member can be disposed on a first surface of a housing. The housing can be translated in a first direction along a first plane proximate a mounting bracket, the mounting bracket having a first rigid surface proximate the first surface of the housing. The housing can be translated in a second direction along a second plane proximate the mounting bracket. The translation in the second direction can engage the first member with a first feature adapted to slidably engage the first member. The first member can be disposed at least partially within the first feature using a latch disposed at least partially within the first feature. The latch can be biased to a first position permitting the engagement of the first member and the first feature and preventing disengagement of the first member from the first feature.

Another system for mounting a device is also provided. The system can include a means for translating a housing in a first direction along a first plane proximate a mounting bracket, the mounting bracket having a first rigid surface proximate a first surface of the housing. The system can further include a means for engaging the first member with a first feature adapted to slidably engage the first member and a means for trapping the first member at least partially within the first feature using a latch disposed at least partially within the first feature, thereby attaching the housing to the mounting bracket when the latch is disposed in a first position.

BRIEF DESCRIPTION OF THE DRAWINGS

So that the manner in which the above recited features can be understood in detail, a more particular description may be had by reference to one or more embodiments, some of which are illustrated in the appended drawings. It is to be noted, however, that the appended drawings illustrate only typical or exemplary embodiments and are therefore not to be considered limiting of its scope, for other, equally effective, embodiments may exist.

Advantages of one or more disclosed embodiments may become apparent upon reading the following detailed description and upon reference to the drawings in which.

DETAILED DESCRIPTION

Figure 1:
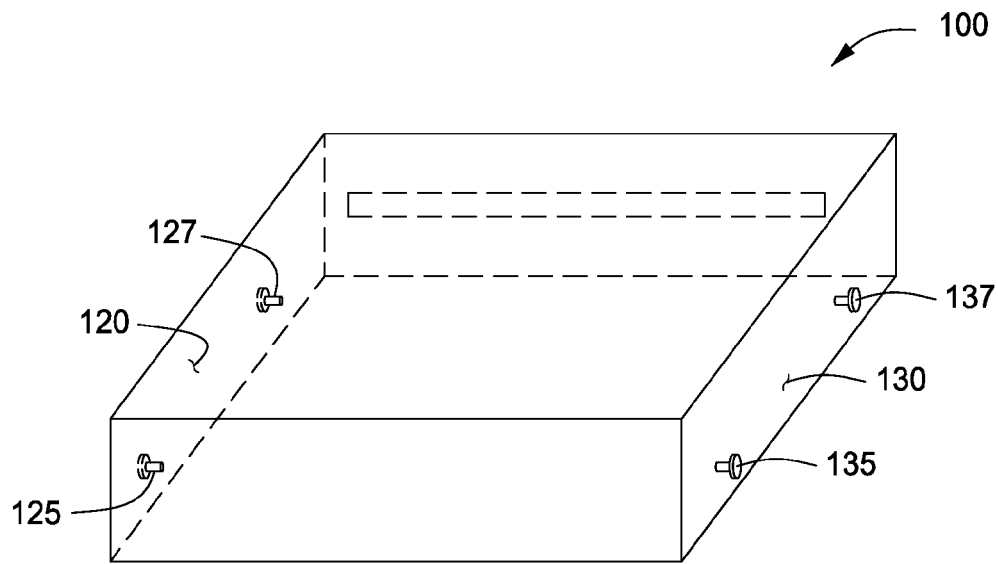
FIG. 1 is a perspective view depicting an illustrative housing, according to one or more embodiments described herein.

FIG. 1 is a perspective view depicting an illustrative housing 100, according to one or more embodiments. In one or more embodiments, the housing 100 can be a partially or completely enclosed structure, for example a full or partial structure surrounding an internal void space. One or more electronic or logic devices can be partially or completely disposed within the void space formed by the housing. For example, one or more optical disk drives ("ODDs"); hard disk drives ("HDDs"); solid state drives ("SSDs"); floppy disk drives ("FDDs") or power supplies can be partially or completely disposed in, on, or about the housing 100. The housing 100 can have any geometric shape, configuration, or orientation suitable for housing an electronic device therein. For simplicity and as an aid to description, an exemplary housing 100 configured as a cuboid (i.e., a partially or completely enclosed rectangular box) will be described herein, although other equally effective geometric shapes and configurations may exist in other exemplary embodiments.

The housing 100 can include a first surface 120 and a second surface 130. In one or more embodiments, the first surface 120 and the second surface 130 can be opposing sides of a cuboid as depicted in FIG. 1. In one or more embodiments, a first member 125 can be disposed in, on, or about the first surface 120. In one or more embodiments, a second member 135 can be disposed in, on, or about the second surface 130. In one or more embodiments, a third member 127 can be disposed distal from the first member 125 on the first surface 120. In one or more embodiments, a fourth member 137 can be disposed distal from the second member 135 on the second surface 130. All or a portion of the first 125, second 135, third 127, and fourth 137 members can be used to detachably attach the housing 100 to a structure surrounding the housing, for example a mounting bracket disposed partially or completely within a computing device.

All or a portion of the first 125, second 135, third 127, and fourth 137 members can be threaded fasteners, for example screws, cap screws, machine screws, studs or the like partially or completely inserted into complimentary threaded receivers disposed in, on, or about the housing 100. In one or more embodiments, all or a portion of the first 125, second 135, third 127, and fourth 137 members can be permanently attached to the housing 100, for example one or more protrusions integrally formed within the first 120 and second 130 surfaces, or one or more rivets or posts permanently attached to the first 120 and second 130 surfaces. In one or more embodiments, the spacing between the first 125 and third 127 members and between the second 135 and fourth 137 members can be about 3 inches to about 4 inches. In one or more specific embodiments, the spacing between the first 125 and third 127 members and between the second 135 and fourth 137 members can be about 3.125".

Figure 2:
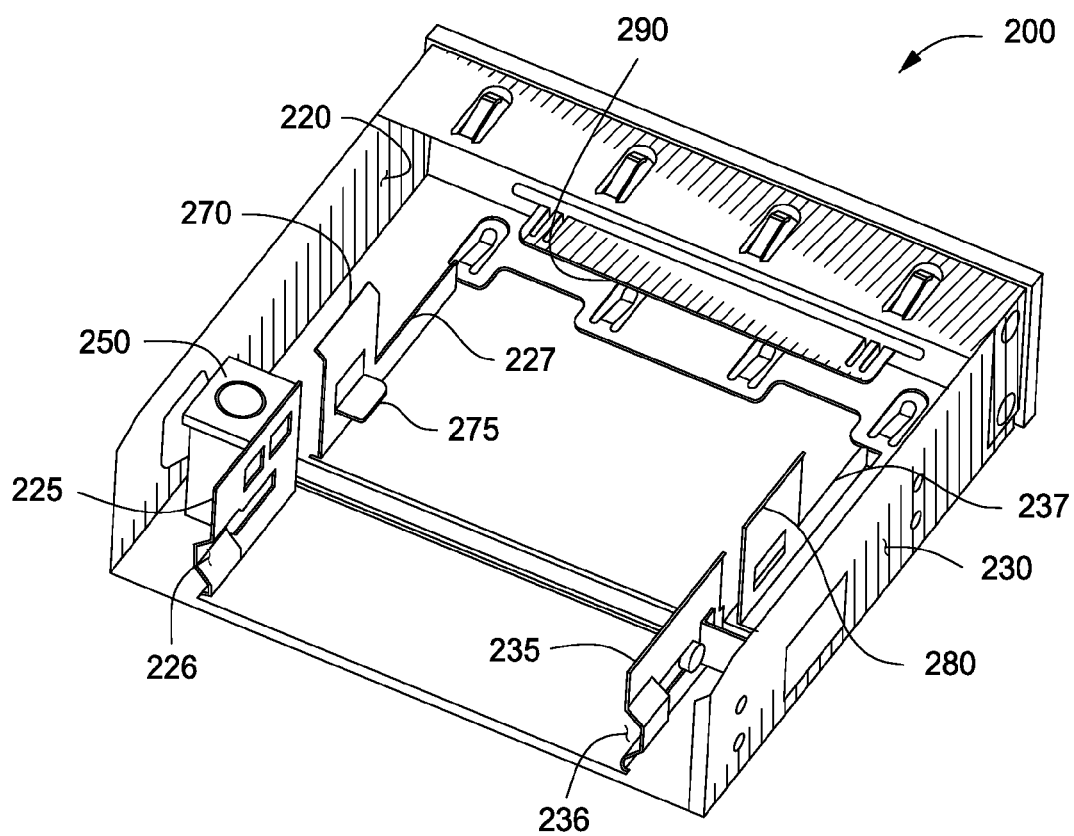
FIG. 2 is a perspective view depicting an illustrative mounting bracket, according to one or more embodiments described herein.

FIG. 2 is a perspective view depicting an illustrative mounting bracket 200, according to one or more embodiments. In one or more embodiments, the mounting bracket 200 can be adapted to receive the housing 100. The mounting bracket 200 can include a single mounting bracket or multiple mounting brackets 200 forming a unitary structure, for example a plurality of brackets formed into a "tower" arrangement disposed within a case housing a computing device. The mounting bracket 200 can be a unitary structure, for example a stamped sheet metal device as depicted in FIG. 2, or an assembly containing multiple, connected, structures. The mounting bracket 200 can be adapted for the detachable attachment of one or more housings 100, for example the detachable attachment of a power supply, an optical disk drive, and a hard disk drive in three independent mounting brackets 200 partially or completely disposed within the case housing a computing device.

In one or more embodiments, the mounting bracket 200 can include a first rigid surface 220 and a second rigid surface 230. In one or more embodiments, the first 220 and second 230 rigid surfaces can include one or more surfaces stamped from or otherwise fabricated using the sheet metal forming the structure of the mounting bracket 200. The first 220 and second 230 rigid surfaces can provide a secure mounting surface for the housing 100, for example all or a portion of the first rigid surface 220 can be disposed proximate the first surface 120 of the housing 100 when the housing 100 is partially or completely disposed within the mounting bracket 200. Similarly, all or a portion of the second rigid surface 230 can be disposed proximate the second surface 130 of the housing 100 when the housing 100 is partially or completely disposed within the mounting bracket 200.

One or more first features 225 can be disposed in, on, or about all or a portion of the first rigid surface 220. The one or more first features 225 can include any number of devices, systems, or combinations of systems and devices suitable for accommodating the first member 125 disposed on the first surface 120 of the housing 100. In one or more specific embodiments, the one or more first features 225 can include a channel or open conduit 226 as depicted in FIG. 2. Such a channel or open conduit 226 can accommodate the passage of the first member 125 when the housing 100 is translated or otherwise passed in a direction coincident with the longitudinal axis of the channel or open conduit 226.

In a like manner, one or more second features 235 can be disposed in, on, or about all or a portion of the second rigid surface 230. The one or more second features 235 can include any number of devices, systems, or combinations of systems and devices suitable for accommodating the second member 135 disposed on the second surface 130 of the housing 100. In one or more specific embodiments, the one or more first features can include a channel or open conduit 236 as depicted in FIG. 2. In a like manner to the channel or open conduit 226, the channel or open conduit 236 can accommodate the passage of the second member 135 when the housing 100 is translated or otherwise passed in a direction coincident with the longitudinal axis of the channel or open conduit 236.

One or more third features 227 can be disposed in, on, or about the first rigid surface 220. The one or more third features 227 can include any number of systems, devices, or combination of systems and devices suitable for supporting the housing 100 via the one or more third members 127 extending from the first surface 120 of the housing 100. In one or more specific embodiments, the one or more third features 227 can include, but are not limited to, one or more ridges or support members, all or a portion of which can be adapted to support at least a portion of the third member 127 extending from the first surface 120 of the housing 100.

In a like manner, one or more fourth features 237 can be disposed in, on, or about the second rigid surface 230. The one or more fourth features 237 can include any number of systems, devices, or combination of systems and devices adapted to support the housing 100 via the one or more fourth members 137 extending from the second surface 130 of the housing 100. In one or more specific embodiments, the one or more fourth features 237 can include, but are not limited to, one or more ridges or support members, all or a portion of which can be adapted to support at least a portion of the fourth member 137 extending from the second surface 130 of the housing 100.

The latch 250 can be at least partially disposed in, on, or about the first feature 225. The latch 250 can include any number of systems, devices, or combination of systems and devices adapted to detachably attach the housing 100 to the mounting bracket 200 using at least a portion of the first member 125 extending from the first surface 120 of the housing 100. The one or more latches 250 can include, but are not limited to one or more mechanical, electrical, or electromechanical devices adapted to permit the acceptance of the first member 125 within the first feature 225 when in a first position while preventing the removal of the first member 125 from the first feature 225 without displacement of the latch to a second position. In one or more specific embodiments, the latch 250 can be biased to the first position using one or more tension devices, for example one or more coil springs, helical springs, or leaf springs or the like.

One or more supports 270 can be disposed in, on, or about the first rigid surface 220. The one or more supports 270 can include any number of systems, devices, or combination of systems and devices suitable for supporting the housing 100. In one or more embodiments, the one or more supports 270 can include, but are not limited to, one or more shelves or similar support members 275 adapted to support one or more surfaces forming the housing 100, for example one or more shelves or similar support members 275 adapted to support the bottom surface of the housing 100 as depicted in FIG. 2. Similarly, one or more supports 280 can be disposed in, on, or about the second rigid surface 230.

One or more support members 290 can also be disposed in, on, or about the mounting bracket 200. The one or more supports 270 can include any number of systems, devices, or combination of systems and devices suitable for supporting or otherwise restraining or restricting motion of the housing 100. In one or more embodiments, the one or more support members 290 can include, but are not limited to, one or more shelves or the like adapted to support one or more surfaces forming the housing 100, for example one or more shelves 290 adapted to support the upper surface of the housing 100 as depicted in FIG. 2.

The terms "upper," "lower," "top," "bottom" and other like terms used herein refer to relative positions to another and are not intended, nor should be interpreted, to denote a particular absolute direction or spatial orientation. For example, a feature described as being disposed on or proximate the "bottom" surface of a device could be disposed on or proximate the "top" surface or a "side" surface of the device if the device is rotated or inverted; such rotation or inversion is envisioned to be within the scope of one or more claimed embodiments described herein.

Figure 3:
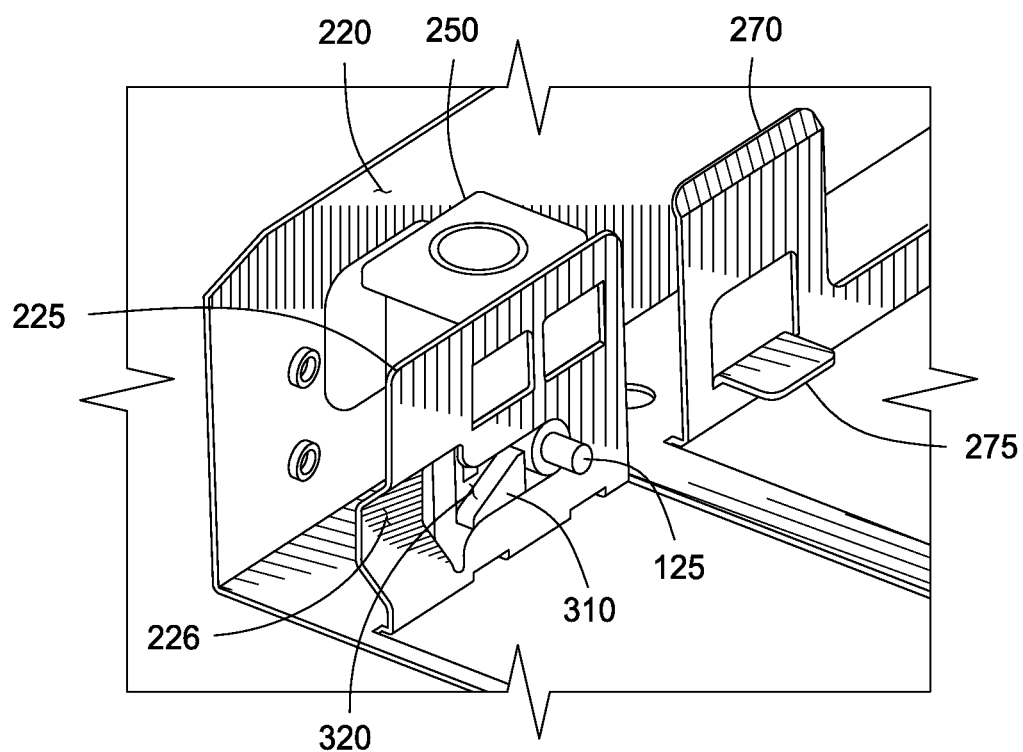
FIG. 3 is a detail perspective view of an illustrative latch disposed in the illustrative mounting bracket depicted in FIG. 2, according to one or more embodiments described herein.

FIG. 3 is a detail perspective view of an illustrative latch 250 disposed in the illustrative mounting bracket 200 depicted in FIG. 2. Although an illustrative first member 125 is depicted in FIG. 3, the illustrative housing 100 to which the first member 125 is attached has been omitted for clarity. In one or more embodiments, the latch 250 can be a mechanical device having two or more positions, for example the two position mechanical latch 250 depicted in FIG. 3. In a first position, as depicted in FIG. 3, the latch 250 can permit the insertion of the first member 125 into all or a portion of the first feature 225, for example by slidably engaging the first member 125 with the channel or open conduit 226. In one or more embodiments, the latch 250 can be displaced to a second position, for example by applying a displacement force using one or more fingers.

In one or more specific embodiments, the latch 250 can include a detent composed of a ramp shaped member 310 disposed in a channel 320 formed in the latch 250. When the latch 250 is disposed in the first position, the ramp-shaped member 310 can permit the insertion of the first member 125 into the latch 250, for example by displacing the latch 250 in a downward direction as a displacement force is applied forcing the first member 125 to travel "up" or "across" the ramp-shaped member 310. In the first position the vertical portion of the ramp-shaped member 310 can serve to prevent the unintended detachment of the first member 125 from the first feature 225.

In one or more specific embodiments, the latch 250 can be displaced to a second position, for example by the application of finger pressure to the latch 250. In the second position the ramp-shaped member 310 can be displaced from the channel or open conduit 226, thereby permitting the withdrawal of the first member 125 from the first feature 225. In one or more embodiments, the latch 250 can be biased to the first position using one or more tension devices such that upon removal of finger pressure the latch 250 returns from the second position to the first position.

Figure 4:
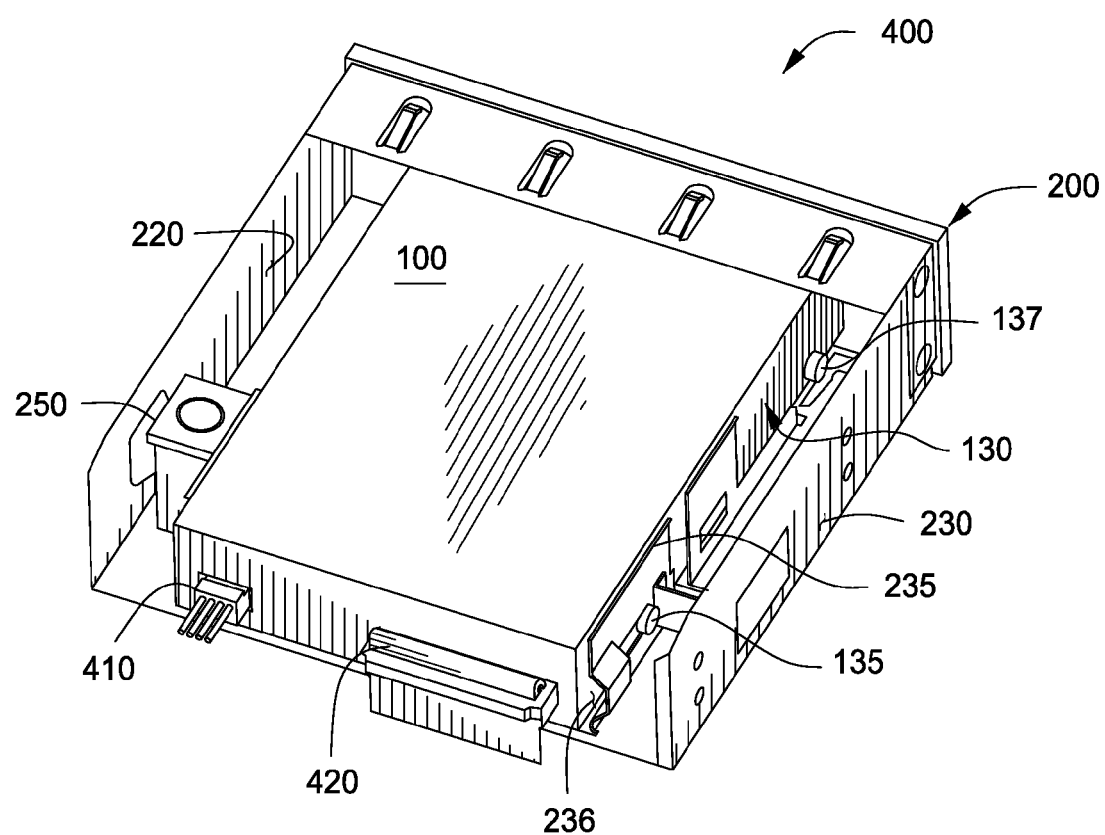
FIG. 4 is a perspective view depicting an illustrative mounting system employing the illustrative housing depicted in FIG. 1 mounted within the illustrative mounting bracket depicted in FIG. 2, according to one or more embodiments described herein.

FIG. 4 is a perspective view depicting an illustrative device mounting system 400 employing the illustrative housing 100 depicted in FIG. 1 disposed within the illustrative mounting bracket 200 depicted in FIG. 2, according to one or more embodiments. The housing 100 can be inserted or otherwise disposed within the mounting bracket 200 as depicted in FIG. 4. When disposed in the mounting bracket 200, the first surface 120 of the housing 100 can be proximate all or a portion of the first rigid surface 220 of the mounting bracket 200. Similarly, the second surface 130 of the housing 100 can be proximate all or a portion of the second rigid surface 230 of the mounting bracket 200.

In one or more specific embodiments, at least a portion of the second member 135 can be disposed proximate at least a portion of the second feature 235 disposed in, on, or about the mounting bracket 200. Similarly, at least a portion of the fourth member 137 can be disposed proximate at least a portion of the fourth feature 237. When disposed within the mounting bracket 200, all or a portion of the support 280 can be disposed proximate the bottom of the housing 100 as depicted in FIG. 4.

In one or more embodiments, at least one power connection 410 can be communicatively coupled to the housing 100 or to the electronic device disposed at least partially within the housing 100. The power connection 410 can include, but is not limited to, a 3 volt direct current ("VDC") power source, a 5 VDC power source, or 12 VDC power source, for example the power source provided all or in part by a computing device power supply. Similarly, in one or more embodiments, at least one communications bus 420 can be communicatively coupled to the housing 100 or to the electronic device disposed at least partially within the housing 100. In one or more embodiments, the communications bus 420 can be a serial or parallel communications bus, including, but not limited to a Universal Serial Bus ("USB") communications bus, a serial ATA (SATA) communications bus, an Integrated Drive Electronics ("IDE") communications bus, an IEEE 1194 ("Firewire") communications bus, or the like.

Figure 5:
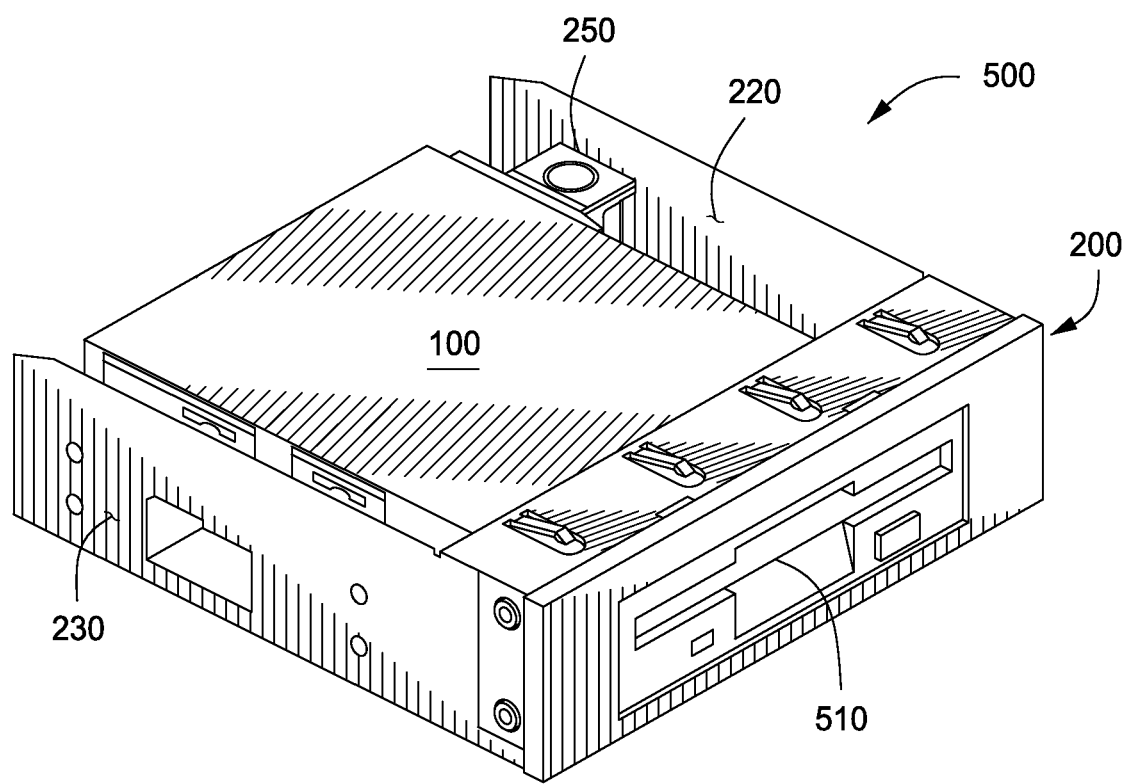
FIG. 5 is another perspective view depicting an illustrative mounting system employing the illustrative housing depicted in FIG. 1 mounted within the illustrative mounting bracket depicted in FIG. 2, according to one or more embodiments described herein.

FIG. 5 is another perspective view depicting an illustrative device mounting system 500 employing the illustrative housing 100 depicted in FIG. 1 mounted within the illustrative mounting bracket 200 depicted in FIG. 2, according to one or more embodiments. In one or more embodiments, one or more data storage devices can be partially or completely disposed within the housing 100. In one or more specific embodiments, the one or more data storage devices can include an aperture 510 or other device intended to facilitate the installation and removal of storage media, for example a floppy disk, a hard disk, a solid state disk, an optical storage disk, or the like. In one or more embodiments, after attaching the housing 100 to the mounting bracket 200, all or a portion of the aperture 510 can be accessible from an exterior surface of the computing device in which the mounting bracket 200 is partially or completely disposed.

Figure 6A:
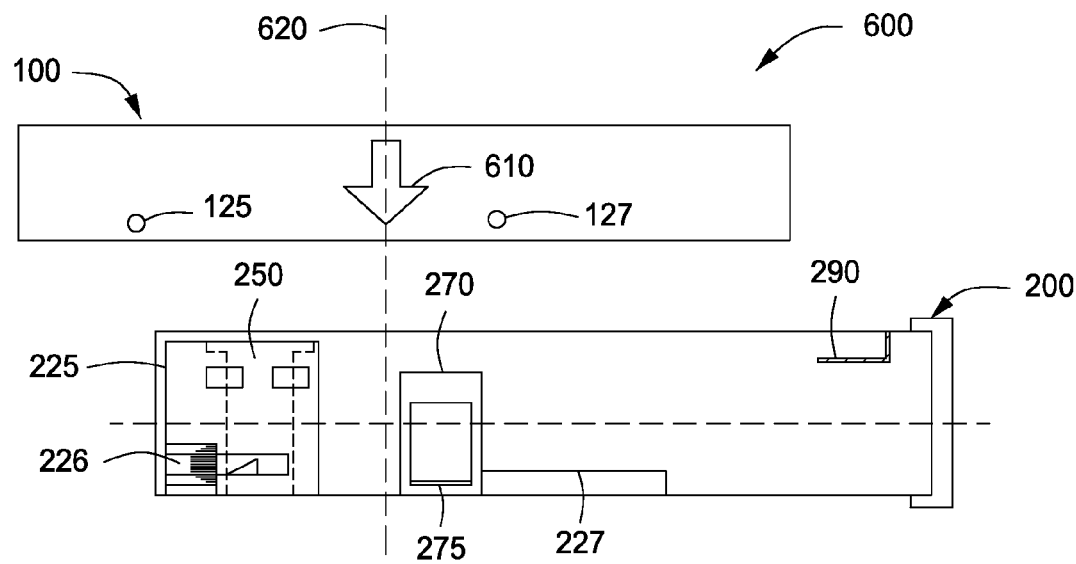
FIGS. 6A, 6B, and 6C are partial cross-sectional views depicting the attachment of an illustrative housing to an illustrative mounting bracket, according to one or more embodiments described herein.
Figure 6B:
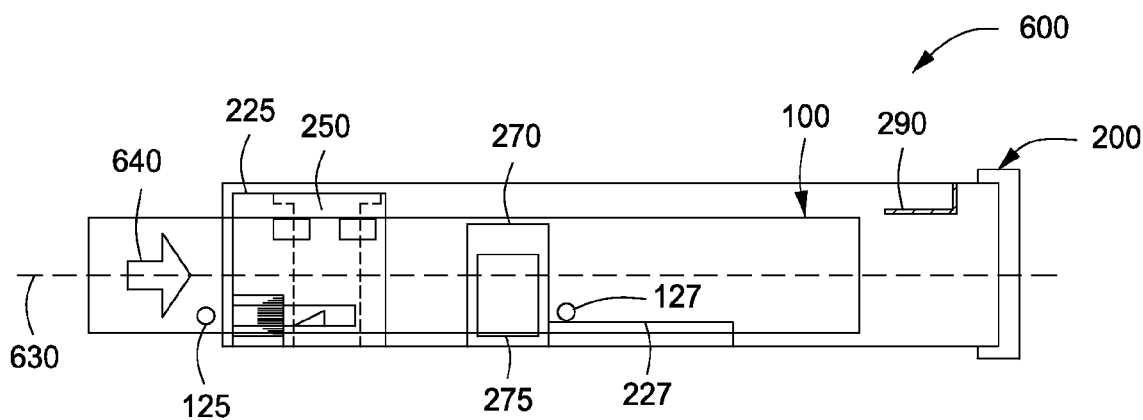
Figure 6C:
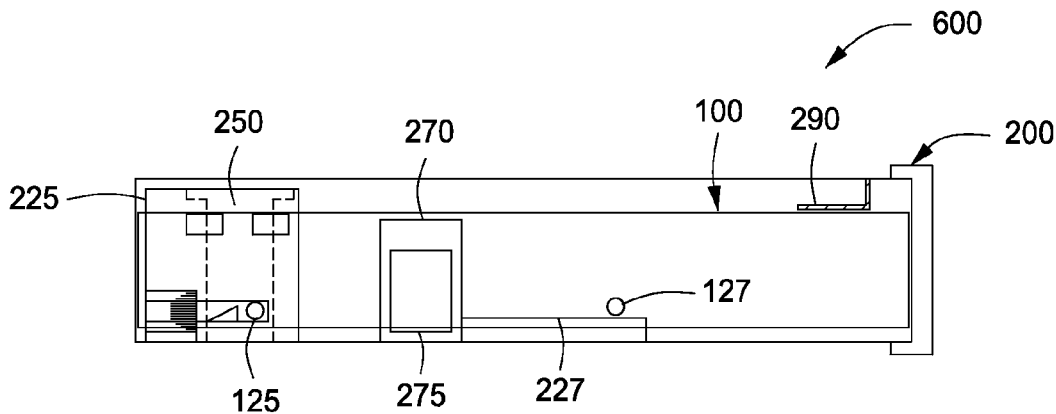

FIGS. 6A, 6B, and 6C are partial cross-sectional views depicting the attachment of an illustrative housing 100 within an illustrative mounting bracket 200, according to one or more embodiments. In one or more embodiments, the housing 100 can be displaced or otherwise translated 610 along a first plane 620 as depicted in FIG. 6A. A second plane 630 can be defined by a transverse bisection of the mounting bracket 200 along the longitudinal axis of the mounting bracket 200. In one or more embodiments, the angle formed by the first plane 620 measured with respect to the second plane 630 can be about 75° or more; about 80° or more; about 85° or more; or about 90° or more. In one or more specific embodiments, the angle formed by the first plane 620 measured with respect to the second plane 630 can be substantially normal, i.e. at or about 90°.

The housing 100 can be displaced or otherwise translated 610 along the first plane 620 until the third member 127 contacts the third feature 227 as depicted in FIG. 6B. After the third member 127 contacts the third feature 227, the housing 100 can be displaced or otherwise translated 640 along the second plane 630. As the housing is displaced or otherwise translated along the second plane 630, the first member 125 will begin passing through the channel or open conduit 225 until the first member contacts the ramp-shaped member 310 disposed on the latch 250. Application of additional force 640 along the second plane 630 can cause a downward displacement of the latch 250 as the first member 125 rides "up" the ramp-shaped member 310. After the first member 125 passes across the apex of the ramp shaped member 310, the latch 250 can be restored to the first position by one or more tension devices as depicted in FIG. 6C.

Figure 7A:
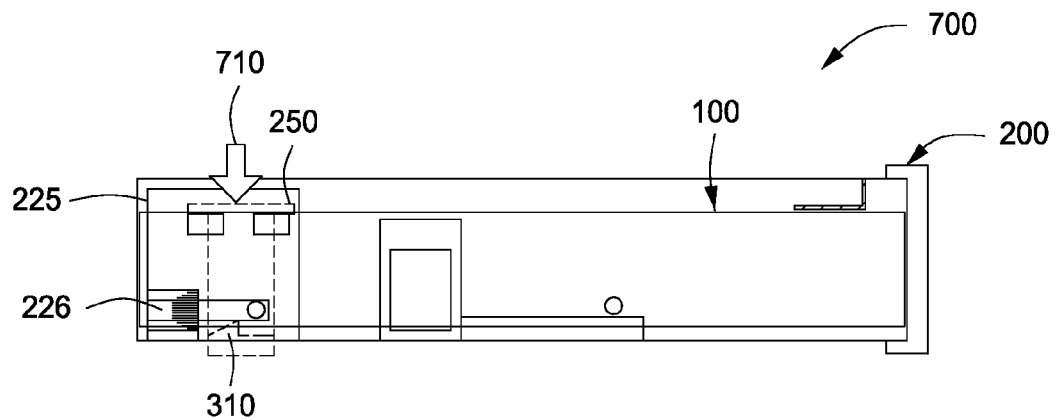
FIGS. 7A, 7B, and 7C are partial cross-sectional views depicting the detachment of an illustrative housing from an illustrative mounting bracket, according to one or more embodiments described herein.
Figure 7B:
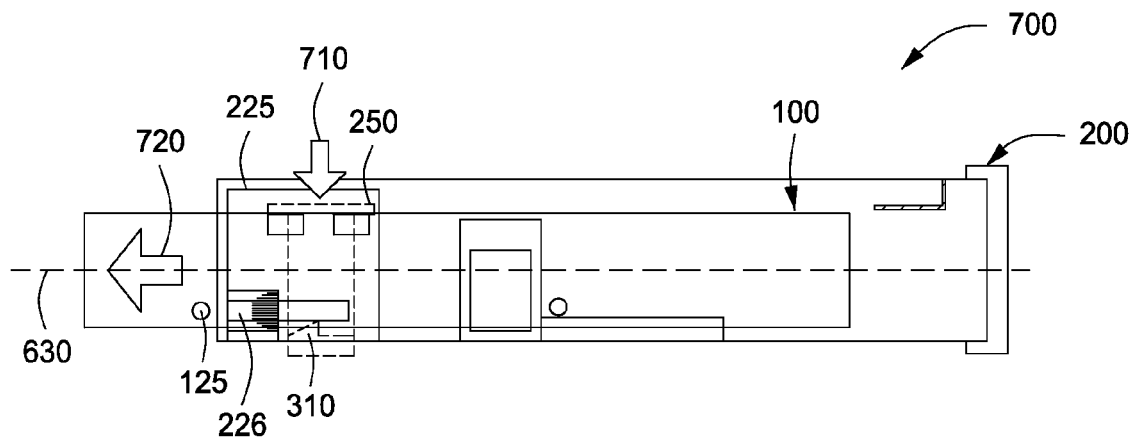
Figure 7C:
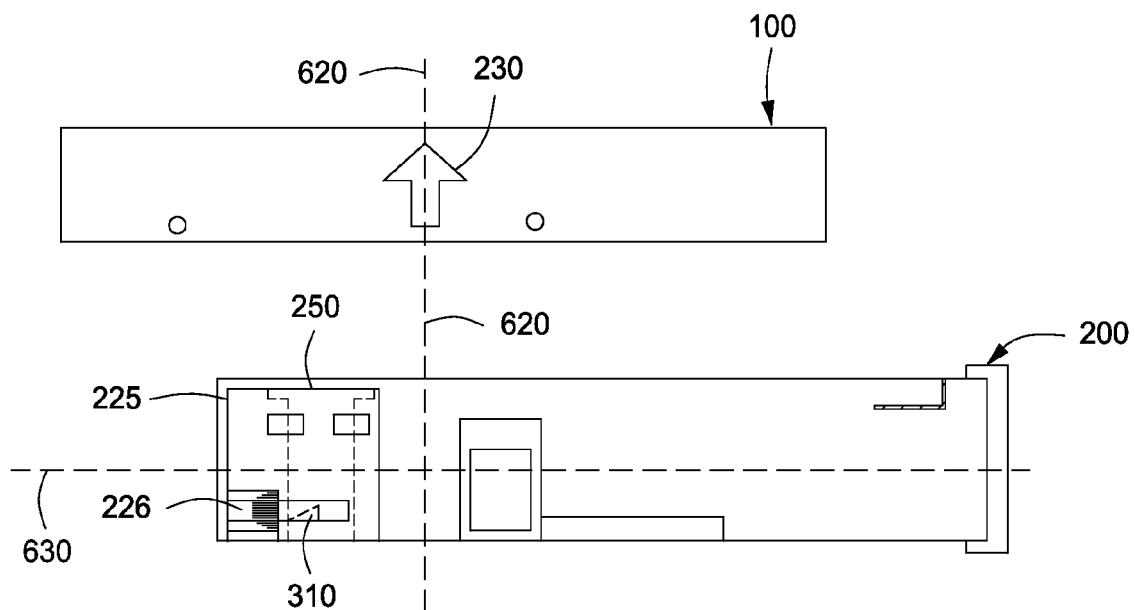

FIGS. 7A, 7B, and 7C are partial cross-sectional views depicting the detachment of an illustrative housing 100 from an illustrative mounting bracket 200, according to one or more embodiments. In one or more embodiments, the latch 250 can be displaced or otherwise translated to the second position by the application of a force 710 to the latch 250. The displacement or translation of the latch 250 to the second position can remove all or a portion of the ramp-shaped member 310 from the channel or open conduit 226 in the first feature 225 as depicted in FIG. 7A.

After displacing the latch to the second position, the housing 100 can be displaced or otherwise translated 720 in a third direction along the second plane 630. The housing 100 can be sufficiently displaced or otherwise translated in the third direction along the second plane 630 such that the first member 125 can exit the channel or open conduit 226 disposed in the first feature 225 as depicted in FIG. 7B.

After the first member 125 exits the channel or open conduit 226 disposed in the first feature 225, the housing can be displaced or otherwise translated 730 in a fourth direction along the first plane 620. The translation or displacement of the housing 100 along the first plane 620 can cause the detachment of the housing 100 from the support member 200 as depicted in FIG. 7C.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

While the foregoing is directed to one or more exemplary or illustrative embodiments, other and further embodiments may be devised without departing from the basic scope thereof, and the scope of all embodiments therefore should be determined by the claims that follow.

What is claimed is:

1. A mounting system comprising:
a housing including a first surface having a first member disposed thereupon;
a mounting bracket adapted to receive the housing;
wherein the mounting bracket comprises a first rigid surface;
wherein the first rigid surface comprises a first feature adapted to slidably engage the first member; and
wherein a latch is disposed at least partially within the first feature and configured to be translated from a first position to a second position;
wherein the latch is adapted to permit the insertion and attachment of the first member to the first feature when disposed in the first position; and
wherein the latch is adapted to permit the detachment and removal of the first member from the first feature when disposed in the second position due to a displacement force applied manually to the latch.

2. The system of claim 1,
wherein the housing further includes a second surface having a second member disposed thereupon; and
wherein the mounting bracket comprises a second rigid surface having a second feature adapted to slidably engage the second member.

3. The system of claim 2,
wherein the housing further comprises a third member disposed on the first surface and a fourth member disposed on the second surface;
wherein the mounting bracket first surface further comprises a third feature proximate the third member when the housing is disposed within the mounting bracket; and
wherein the mounting bracket second surface further comprises a fourth feature proximate the fourth member when the housing is disposed within the mounting bracket.

4. The system of claim 1, wherein the latch comprises a member biased to the first position via at least one tension device.

5. The system of claim 3, wherein the first member and the second member, the third member, and the fourth member comprise threaded fasteners having threads at least partially engaged in mating threaded apertures disposed in the housing.

6. The system of claim 1, wherein the latch comprises a spring-loaded device adapted for manual displacement from the first position to the second position using one or more fingers.

7. The system of claim 1, wherein the first surface and the second surface comprise substantially vertical sidewalls of the housing.

8. The system of claim 1, wherein the first rigid surface and the second rigid surface comprise substantially vertical sidewalls of the mounting bracket;
wherein the first feature comprises a first raised slot projecting inwardly from the first rigid surface, wherein the first raised slot is adapted to receive the first member; and
wherein the second feature comprises a second raised slot projecting inwardly from the second rigid surface, wherein the second raised slot is adapted to receive the second member.

9. The system of claim 3,
wherein the third feature comprises a third raised surface projecting inwardly from the first rigid surface, wherein the third raised surface is adapted to contact at least a portion of the third member; and
wherein the fourth feature comprises a fourth raised surface projecting inwardly from the second rigid surface, wherein the fourth raised surface is adapted to contact at least a portion of the fourth member.

10. A method of mounting a housing comprising:
disposing a first member on a first surface of a housing;
translating the housing in a first direction along a first plane proximate a mounting bracket, the mounting bracket having a first rigid surface proximate the first surface of the housing;
translating the housing in a second direction along a second plane proximate the mounting bracket;
slidably engaging the first member with a first feature adapted to engage the first member; and
trapping the first member at least partially within the first feature using a latch at least partially disposed within the first feature and configured to be translated from a first position to a second position;
wherein the latch is biased to the first position;
wherein the first position permits the engagement of the first member and the first feature due to a displacement force applied by the first member on the latch and prevents the disengagement of the first member from the first feature due to a tension force on the latch.

11. The method of claim 10, further comprising:
displacing the latch to a second position;
translating the housing in a third direction along the second plane a sufficient distance to detach the first member from the first feature; and
translating the housing in a fourth direction along the first plane a sufficient distance to detach the housing from the mounting bracket.

12. The method of claim 10 wherein the first plane forms an angle of from about 75° to about 90° measured with reference to the second plane.

13. The method of claim 11,
wherein the latch comprises a spring-loaded device adapted for manual displacement from the first position to the second position using one or more fingers; and
wherein disposing the latch to a second position comprises toollessly displacing the latch using one or more fingers.

14. The method of claim 10 wherein the first member comprises a threaded fastener having threads at least partially engaged in a mating threaded aperture disposed in the housing.

15. The method of claim 10 wherein the housing comprises an enclosure at least partially enclosing a data storage device.

16. The method of claim 15 wherein the data storage device is selected from the group of storage devices consisting of: a hard disk drive ("HDD"); a solid state drive ("SSD"); a compact disk ("CD") drive; a digital versatile disk ("DVD") drive; and a floppy disk drive.

17. A mounting system, comprising:
a housing adapted to be translated in a first direction along a first plane proximate a mounting bracket, the mounting bracket having a first rigid surface proximate a first surface of the housing;
a channel or open conduit adapted to slidably engage the first member with a first feature; and
a latch adapted to trap the first member at least partially within the first feature and thereby attach the housing to the mounting bracket, wherein the latch is disposed at least partially within the first feature and configured to be translated from a first position to a second position.

18. The system of claim 17, wherein the latch is adapted to be toollessly displaced to the second position and allow the disengagement of the housing from the mounting bracket when disposed in the second position.

19. The system of claim 17,
wherein the housing comprises an enclosure at least partially enclosing a data storage device; and
wherein the storage device is selected from the group of storage devices consisting of: a hard disk drive ("HDD"); a solid state drive ("SSD"); a compact disk ("CD") drive; a digital versatile disk ("DVD") drive; and a floppy disk drive.

20. The system of claim 17, wherein the mounting bracket is disposed at least partially within an enclosure housing a computing device central processing unit ("CPU").

* * * * *